US009614851B1

(12) United States Patent
Vevle et al.

(10) Patent No.: US 9,614,851 B1
(45) Date of Patent: Apr. 4, 2017

(54) SECURITY MANAGEMENT APPLICATION PROVIDING PROXY FOR ADMINISTRATIVE PRIVILEGES

(71) Applicant: OPEN INVENTION NETWORK LLC, Durham, NC (US)

(72) Inventors: Mark R. Vevle, Birmingham, AL (US); Nathan Robert Jones, Atlanta, GA (US)

(73) Assignee: Open Invention Network LLC, Durham, NC (US)

( * ) Notice: Subject to any disclaimer, the term of this patent is extended or adjusted under 35 U.S.C. 154(b) by 0 days.

(21) Appl. No.: 14/191,678

(22) Filed: Feb. 27, 2014

(51) Int. Cl.
*H04L 29/06* (2006.01)

(52) U.S. Cl.
CPC ............ *H04L 63/10* (2013.01); *H04L 63/20* (2013.01)

(58) Field of Classification Search
CPC ............. H04L 63/107; H04L 63/0263; H04L 63/0281; H04L 63/10; H04L 63/20
See application file for complete search history.

(56) References Cited

U.S. PATENT DOCUMENTS

| | | | | |
|---|---|---|---|---|
| 5,911,143 A * | 6/1999 | Deinhart | ............... | G06F 21/604 |
| 6,023,765 A * | 2/2000 | Kuhn | ................. | G06F 21/6218 |
| | | | | 713/166 |
| 8,806,578 B2 * | 8/2014 | Ivanov | ................ | G06F 21/6218 |
| | | | | 726/1 |
| 2003/0037263 A1 * | 2/2003 | Kamat | .................. | G06F 21/604 |
| | | | | 726/14 |
| 2007/0104115 A1 * | 5/2007 | Decasper et al. | ............. | 370/254 |
| 2007/0294404 A1 * | 12/2007 | Boutboul | .............. | H04L 63/101 |
| | | | | 709/226 |
| 2008/0046920 A1 * | 2/2008 | Bill | ........................ | G06Q 30/02 |
| | | | | 725/34 |
| 2008/0120302 A1 * | 5/2008 | Thompson | .......... | G06F 21/6209 |
| 2009/0052451 A1 * | 2/2009 | Etheridge | ............... | H04L 63/20 |
| | | | | 370/392 |
| 2010/0174648 A1 * | 7/2010 | Krantz | ................... | G06Q 10/06 |
| | | | | 705/44 |

(Continued)

FOREIGN PATENT DOCUMENTS

FR    EP 2009865 A1 * 12/2008 ........... H04L 63/101

OTHER PUBLICATIONS

Ferraiolo, David F., and D. Richard Kuhn. "Role-based access controls." arXiv preprint arXiv:0903.2171 (2009).*

(Continued)

*Primary Examiner* — Chau Le
*Assistant Examiner* — Muhammad Chaudhry
(74) *Attorney, Agent, or Firm* — Haynes and Boone, LLP

(57) ABSTRACT

Accessing a security enabled application may require certain access privileges that are not readily available or associated with the application at the time a user is seeking access via a login operation. In operation, an access attempt to a security enabled application may include identifying user credentials associated with the access attempt, generating a query based on the user credentials to identify whether the user credentials are associated with a predetermined group membership. A response to the query may be received that includes group information corresponding to the user and the group information may be compared to a set of predetermined rules to determine whether the group information includes privilege rules used to grant access to the access attempt.

11 Claims, 10 Drawing Sheets

(56) References Cited

U.S. PATENT DOCUMENTS

| | | | | |
|---|---|---|---|---|
| 2010/0220585 A1* | 9/2010 | Poulson | .................. | H04L 45/22 370/216 |
| 2010/0235524 A1* | 9/2010 | Klemm | ................ | A61K 9/5169 709/228 |
| 2011/0066562 A1* | 3/2011 | Stapleton | .............. | G06F 21/604 705/317 |
| 2012/0131646 A1* | 5/2012 | Chandolu | ........... | G06F 21/6218 726/4 |
| 2014/0108648 A1* | 4/2014 | Nelke | ................ | H04L 41/5051 709/224 |
| 2014/0196115 A1* | 7/2014 | Pelykh | .............................. | 726/4 |
| 2014/0229269 A1* | 8/2014 | Davies | .............. | G06Q 30/0243 705/14.42 |
| 2014/0343989 A1* | 11/2014 | Martini | ........................ | 705/7.17 |

OTHER PUBLICATIONS

Chadwick, David W., and Alexander Otenko. "The PERMIS X. 509 role based privilege management infrastructure." Proceedings of the seventh ACM symposium on Access control models and technologies. ACM, 2002.*

* cited by examiner

SECURITY MANAGEMENT APPLICATION PROVIDING PROXY FOR ADMINISTRATIVE PRIVILEGES

TECHNICAL FIELD OF THE APPLICATION

This application relates to a method and apparatus of accessing a security application via a computer device, and more particularly, to identifying the user's rights and privileges via group associations of the user.

BACKGROUND OF THE APPLICATION

Conventionally, in a communication data networking environment if a user operating a network computer device was going to manage membership of a particular group of users, they would need specific management rights over that particular group or the 'container' in which the group is operating. Normally, that user attempting to perform management operations would need specifically granted rights.

A flexible method of distributing permissions to certain users to perform administrative level tasks for a large-scale communication network infrastructure does not exist in the current security role management applications. Such logic is normally found on the actual specific device, application, or node that would be manipulated by the administrator task each of which would need to be configured separately.

In one specific example, when processing the business rules for permissions, conventional application programming interfaces (APIs) used to manage authorization efforts rely on the operations level of permissions. If the operations indicate that a user should belong to a specific role, that user is associated with the role. Then, the user receiving rights to a privilege is determined by their assigned role association. This scenario provides business rules which cannot be independent of a particular role since the rules are stored within the role. When using such an API, a check against access to operations may be used, however, this is not a true role identification operation.

Using conventional authorization approaches, any operations associated with a role would only pass an access check consistent with that role's privileges, and during any other time not consistent with that role's privileges, the user would neither have access to those operations nor be in the role due to time limitations. Also, if a change is made to the business rules while a user is logged into the conventional security application, the user must log-out and log-back in to the application to experience the changes.

SUMMARY OF THE APPLICATION

One example embodiment may provide a method that includes receiving an access attempt to a security enabled application, identifying user credentials associated with the access attempt, generating a query based on the user credentials to identify whether the user credentials are associated with at least one predetermined group membership, receiving a response to the query including group information corresponding to the user, and comparing the group information to a set of predetermined rules to determine whether the group information includes privilege rules used to grant access to the access attempt.

Another example embodiment may include an apparatus that includes a receiver configured to receive an access attempt to a security enabled application, a processor configured to identify user credentials associated with the access attempt, generate a query based on the user credentials to identify whether the user credentials are associated with at least one predetermined group membership, receive a response to the query comprising group information corresponding to the user, and compare the group information to a set of predetermined rules to determine whether the group information comprises privilege rules used to grant access to the access attempt.

DETAILED DESCRIPTION OF THE APPLICATION

Figure 1:
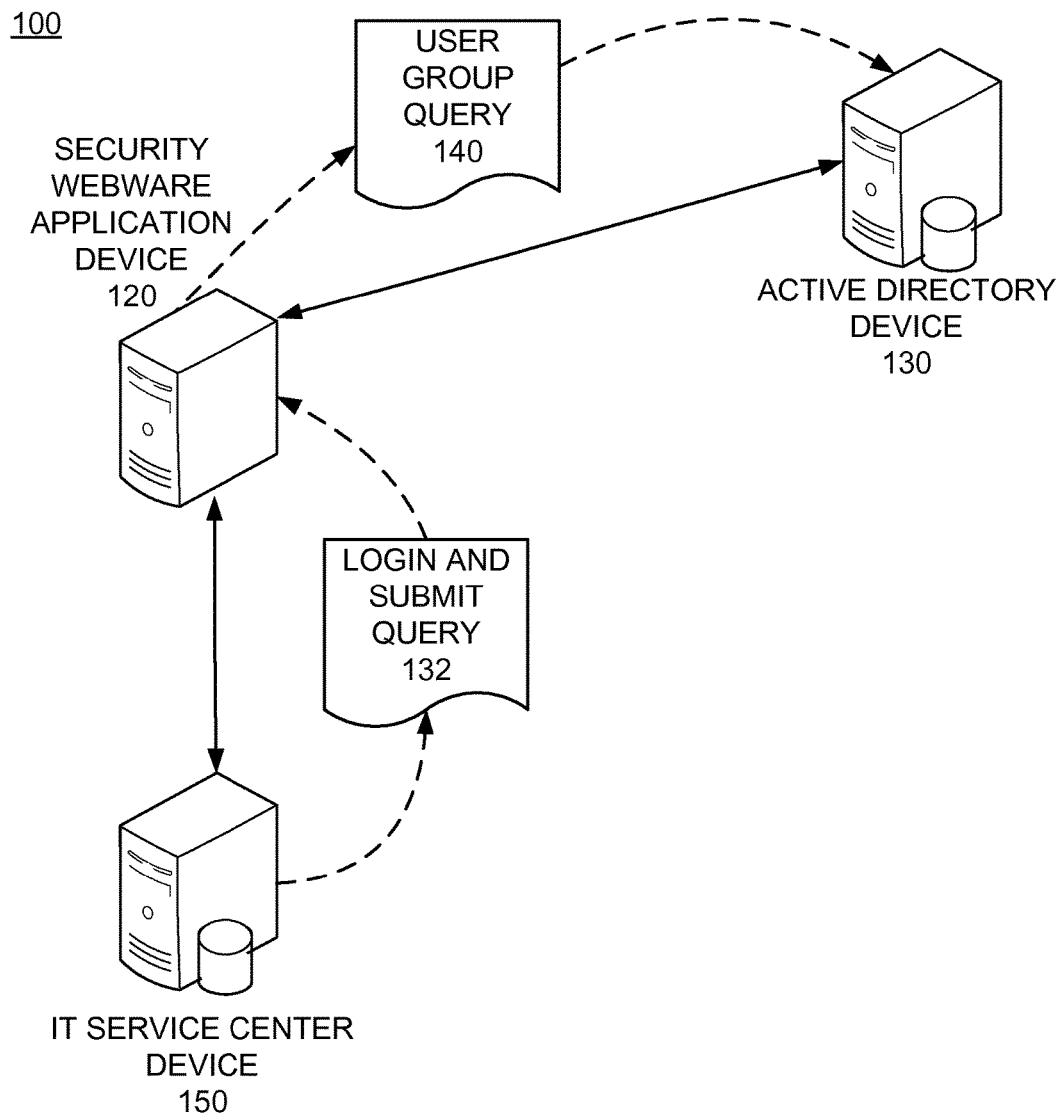
FIG. 1 illustrates an example communication network according to example embodiments of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, a user may access a user interface for a security role management application to perform administrative level tasks. Examples may provide distributing permissions to perform administrative level tasks to users for all infrastructure related activities in a security role management application. For example, if a user wanted to manage membership of a group, the user would only need to meet the criteria of a rule defined by the security role management application to view another user's history. Then, the user could perform this action as long as their active directory group had such a rule to allow this within the XML file. The rules in the .xml file can be based on the corresponding active directory group, the operation they would like to perform, and/or the resources effected. Another example might be managing Exchange mail settings for user accounts, the user would only need to meet the rule criteria.

Example embodiments provide an outlet to handle administrator activities for an infrastructure in one application. The security webware application permits security administration to occur for applications, devices, and nodes. Security webware or the security application communicates via lightweight directory access protocol (LDAP) to an active directory to gather information on the active directory groups for the user. Then, the application compares the groups to a defined set of rules within an XML file. This XML file is easily configurable and sets permissions within the application for each active directory group.

According to example embodiments, the proxy user permissions application technique has a robust architecture that leverages different platforms, stores rules, etc. The proxy user permissions (PUP) rules are maintained in an application agnostic XML file and have a more flexible interface with the active directory instead of the application itself. The active directory does not have to pass specified parameters as the PUP will use the source user object to determine access. In addition to the source user, one or more active directory objects can be passed to the PUP to make access determinations. Based on all objects passed to the PUP, the rule logic will be applied taking all passed objects into consideration. The XML format is also more intuitive to traverse when making updates.

According to another example, by using the PUP rules, the operations and roles are both taken into consideration when applying user access. PUP analyzes a user's operation privileges and roles. PUP does not associate or dissociate a user with a role based on their operation privileges. If, for example, a user can sometimes perform tasks within a role, the user is always in that role. However, a conditional operation privilege can be added to determine when the user can perform certain tasks within a role. Thus, the PUP adds another layer of logic by independently analyzing operations and roles, and the relationships therebetween. Business rules may exist for operations but not for roles. Roles are purely determined by membership in configured security groups. As a result, two users in the same role may have different results when attempting to perform a task based on the operation rules. The conditions on roles/operations can be with regard to the role action to be performed and/or what resource will be affected. This is explained in additional detail with respect to FIGS. 1-4B.

In one example, if a role is named "BestFriend" with a rule specifying that it is only true on Fridays. Using the PUP, the user would always be in the role "BestFriend", but any associated permissions would be independently evaluated depending on their specific rules. Taking the example further, suppose two operations/permissions are named "CanHaveSomeOfMyCake" and "IsAwesome". Using PUP, each permission could have a separate rule to differentiate them from one another. For this example, both would have an "is in role" rule check applied against "BestFriend", but could if "CanHaveSomeOfMyCake" is only true on Friday then have "IsAwesome" is also true on Thursday. This approach offers greater configurability, and places the definitions of various operations closer to the place where evaluation is performed. Also, PUP can apply rule changes during the user's active session instead of having to log out and log back into the application as required by the conventional approach of FIG. 5A.

Certain terms used throughout application may be referring to the same entity unless specified otherwise. Information technology (IT) service center may be an issue resolution group/help desk within an enterprise. The security WEBWARE or security application is a custom security management tool. The active directory is a domain controller that assigns and enforces security policies.

FIG. 1 illustrates an example network configuration according to example embodiments. Referring to FIG. 1, the network 100 includes an IT service center device 150, a security application device 120 and an active directory service device 130. One or more of the devices may be consolidated to share devices and operate different functions and/or applications, however, in this configuration, the IT service center, the security application and the active directory operate on separate devices.

In operation, a user may log into the security application via their device 150 and submit a query 132. The security application 120 may generate a specific query for the user groups 140 and query the active directory for that specific user's groups via the lightweight directory access protocol. The active directory 130 may return user groups that the user is currently a member, and those groups may be returned from the active directory. The security application may then gather the rules from the active directory in order to compare them against the privilege rules. The group rules may then be compared to predetermined rules stored in an XML file. The rules determine if a user in the user's active directory group can perform certain administrative tasks. Also, a different rule may exist to grant privileges to a group. If a rule does not exist in the XML file to grant a privilege to the user's group, the process is complete. However, if such a rule does exist, the user's desired administrative task is allowed. As a result, an administrative change may be performed to the security application that is not normally granted to that user's particular group role(s). The user may then perform an administrative change by having the security application perform the actual administrative task(s) to materialize the change made by the user.

Figure 2:
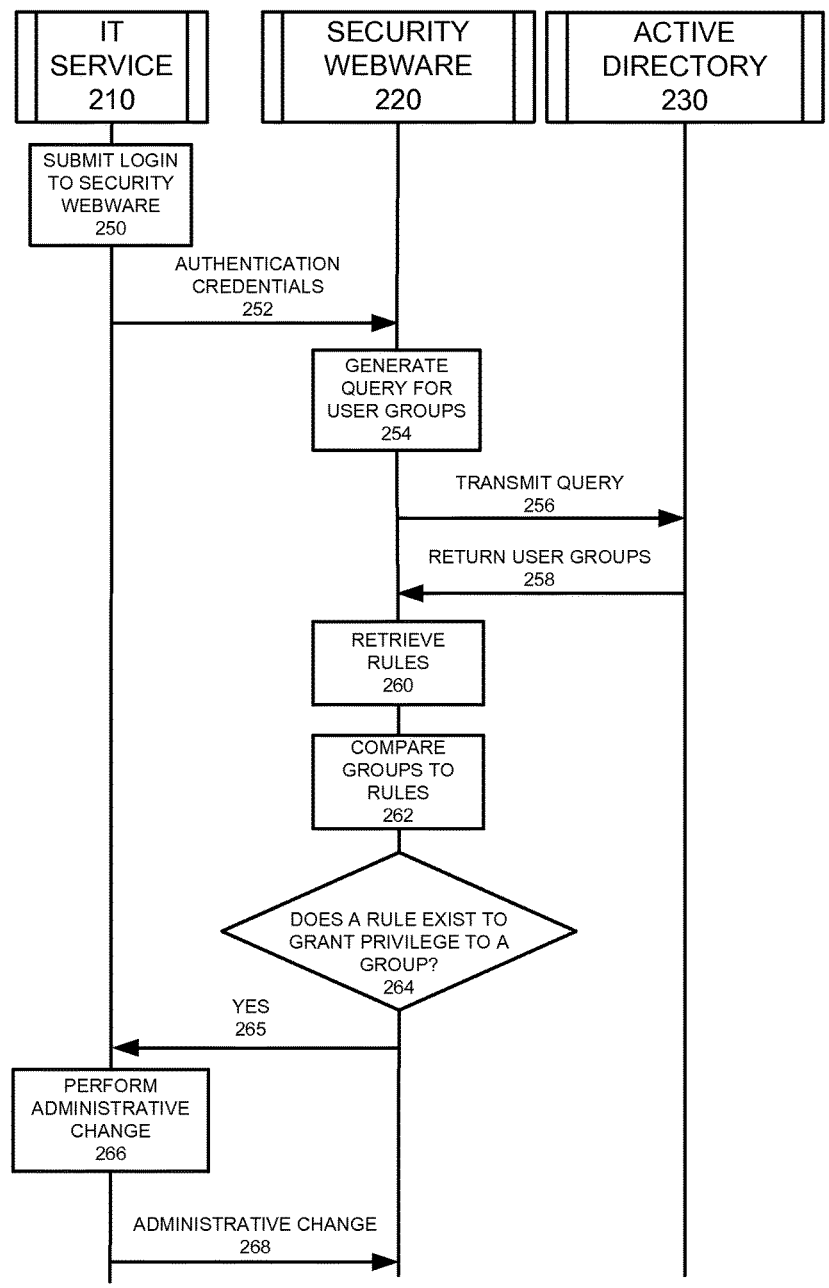
FIG. 2 illustrates an example system communication diagram according to example embodiments of the present application.

FIG. 2 illustrates an example system signaling diagram according to example embodiments. Referring to FIG. 2, the example communication process 200 includes a series of messages exchanged between the IT service 210, the security application 220 and active directory 230. In one example, the user may access an IT workstation and submit login credentials 250 to the security application 220. The user's group information may then be identified based on the user's login information, and the security application 220 may generate a query 254 for user groups stored in the active directory 240. The query is transmitted 256 to the active directory and the user groups are then returned 258 to the security application. The security application may use the LDAP protocol to perform the query. The application may need information about the user's groups(s) to identify which rules apply from the XML file of rules. The rules are then retrieved 260 and the group rules are compared 262 to the XML file of rules for comparisons. A determination is made as to whether a rule exists that grants a privilege to the group 264. If so 265, the IT service 210 will perform the administrative change 266 to reflect the updated status based on the rule. The administrative change 268 may then be performed to the security application 220. The rules are setup in the XML file so they are easily configurable. The rules determine if a user in the user's active directory group can perform certain administrative tasks. The user's applicable capabilities, which are based on the rule/group analysis may then be displayed on a user interface. The user makes an administrative change in the security application that is not normally granted to that typical group's role. The security application 220 may then perform the actual administrative task(s) which is logged. The task log will note that the administrative change was performed via the security application.

The user group may perform a user group query by retrieving all groups within an active directory to which the user is a member. The retrieved information and query is compared to rules within an XML file to determine if any of the user's groups have been granted special permissions. The user groups to which the user belongs are contingent upon the user. The groups are typical active directory groups that are used to organize users based on their roles. The rules are stored in a XML file that is retrieved by a security WEBWARE application. The XML file stores rules that pertain to and/or reference active directory groups.

An example of the XML file contents may provide:

```
<Permission name="CreateUser">
    <All>
        <ObjectClass name="user"/>
        <Not>
            <ObjectSubClass name="GenericMailbox"/>
        </Not>
        <Any>
            <IsInRole name="SecurityAdministrator"/>
    <All>
        <IsInRole name="AccountOperator"/>
        <NotDisabled />
        <Any>
            <All>
                <IsSynchronized />
    <Property attribute="Name"pattern="^(?!A-|S-|S_).+?$"/>
        <Property attribute="ManagerLevel"pattern="[1-8]"/>
            </All>
            <All>
                <Not>
                    <Domain name="southernco.com"/>
                </Not>
        <Property attribute="PrimaryAccountSid"pattern=".+"/>
            </All>
            <IsSecondaryAccount />
        </Any>
    </All>
    </Any>
    </All>
</Permission>.
```

The active directory groups are compared to the rules within the XML file since the rules explicitly list which AD groups are granted privileges while those that do not have privileges are not listed. As a result, a rule may exist that makes changes to the user's current role, which may be limited or provide limited access on-the-fly to provide the user with access. Those changes can be made to modify a user's rules. A user's roles will not change in general, but the rules can define different conditions under which membership in a role or other criteria may or may not grant rights to perform certain tasks. These rules are calculated on-the-fly as they pertain to specific AD accounts. For example, a rule to determine whether the current user can add a member to a group would take into account the user's roles as well as properties of the group and its members. Properties may include, for example, who manages the group, is the member already in the group?, etc. The user interface of an application or admin console is updated to enable or disable access to features or tasks depending on the outcome of the rule processing.

Group memberships for the user are first extracted, matched to roles defined in an XML file, and cached. Then as rules are analyzed and applied, the user's role membership can be used as part of the rule analysis. This provides a way for calculating complex sets of rules as they apply to a user between sets of AD accounts. For example, "can user X add user Y to group Z?", or "can user X create a new user account W reporting to user Y". Automated systems, such as batch scripts, that run under authenticated credentials can be subject to these rules as the account they operate under would be the equivalent of a "current user". A "task" that is performed may include creating a new user account, disabling or enabling a user account, creating a group, viewing access on administration screens for certain content, such as Exchange settings. In general, any sort of IT administration task that a user's normal account typically would not have access to perform.

Figure 3:
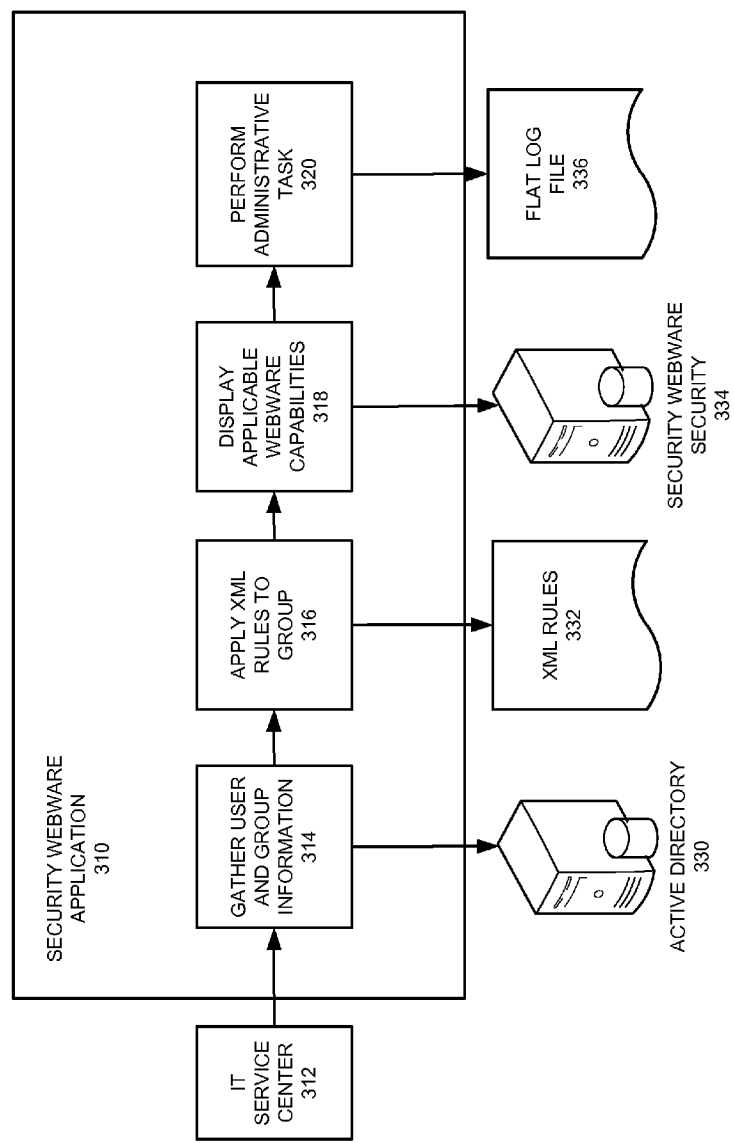
FIG. 3 illustrates an example logic diagram according to example embodiments of the present application.

FIG. 3 illustrates an example data flow and logic example of the administrative and security application platform according to example embodiments. Referring to FIG. 3, the logic diagram 300 includes an IT service center device/system 312 as being remote from the security application platform 310. The process performed by the security application 310 may provide receiving a query or request from the IT center 312 and gathering user and group information 314 from the login or authorization attempt. The information may be retrieved from an active directory API stored on a corresponding device 330. The XML rules may be identified from the XML data file 332 and applied accordingly 316. The current capabilities may be displayed or generated 318 for an automated application to identify and confirm prior to authorization access being granted by the security application operating on a corresponding device 334. The rights may be update, granted and/or shared with the IT service center so any administrative tasks 320 can be performed accordingly. All actions are then logged in a log file 336. In this example, the XML data file 332 holds a set of rules that are analyzed by the security application but which are still configurable by administrators making modifications to the rules. The security server/database 334 stores the security-related data utilized by the security application. The flat log file is used to store actions performed within the security application. Each object has a unique security identifier (SID). Each SID that is affected by a change has a log of the activity.

Figure 4A:
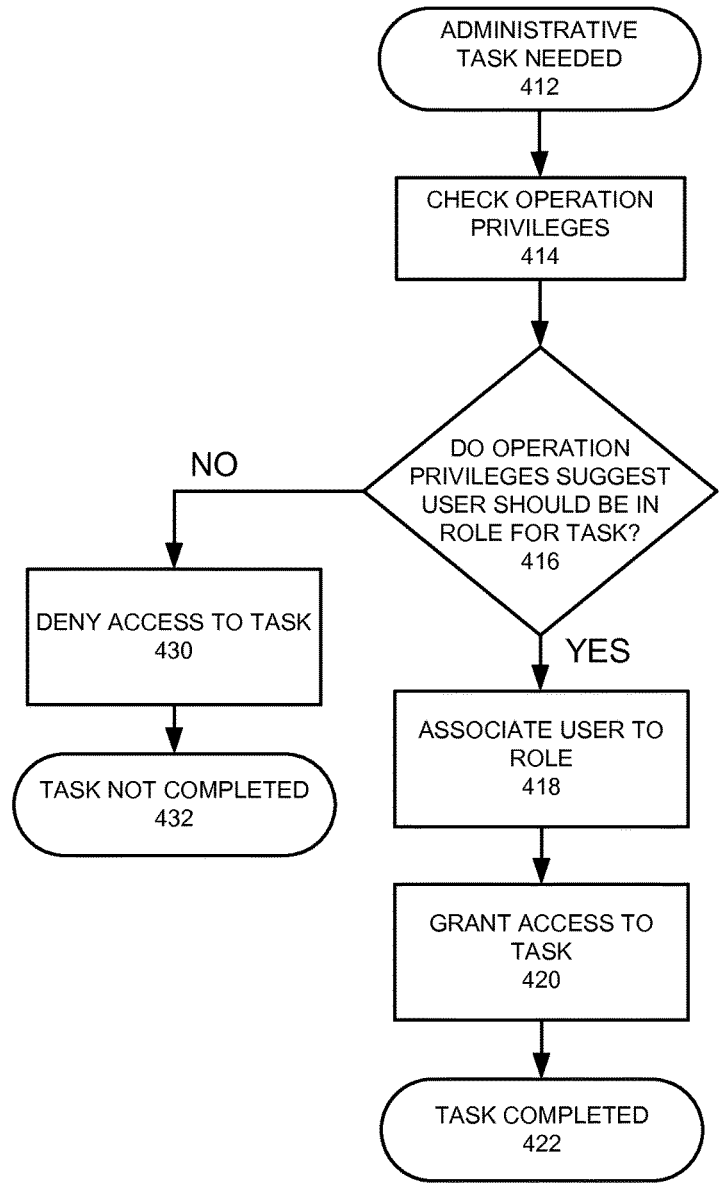
FIG. 4A illustrates an example flow diagram according to example embodiments of the present application.

FIG. 4A illustrates a flow diagram 400 example of authorizing a user access operation. Referring to FIG. 4A, the user may initiate an access operation via an administrative task access operation to determine if any tasks are needed 412. The application may determine whether the operation privileges are existent 414. The operation privileges retrieved may suggest that the user should be assigned to a particular role to perform the task requested 416. If the privileges do not match the task desired, then the user may be denied access to the task 430 and the task will not be completed 432. If the user should be in the role for the task then the user may be associated with the role accordingly 418 and access may be granted 420 to complete the task 422.

Figure 4B:
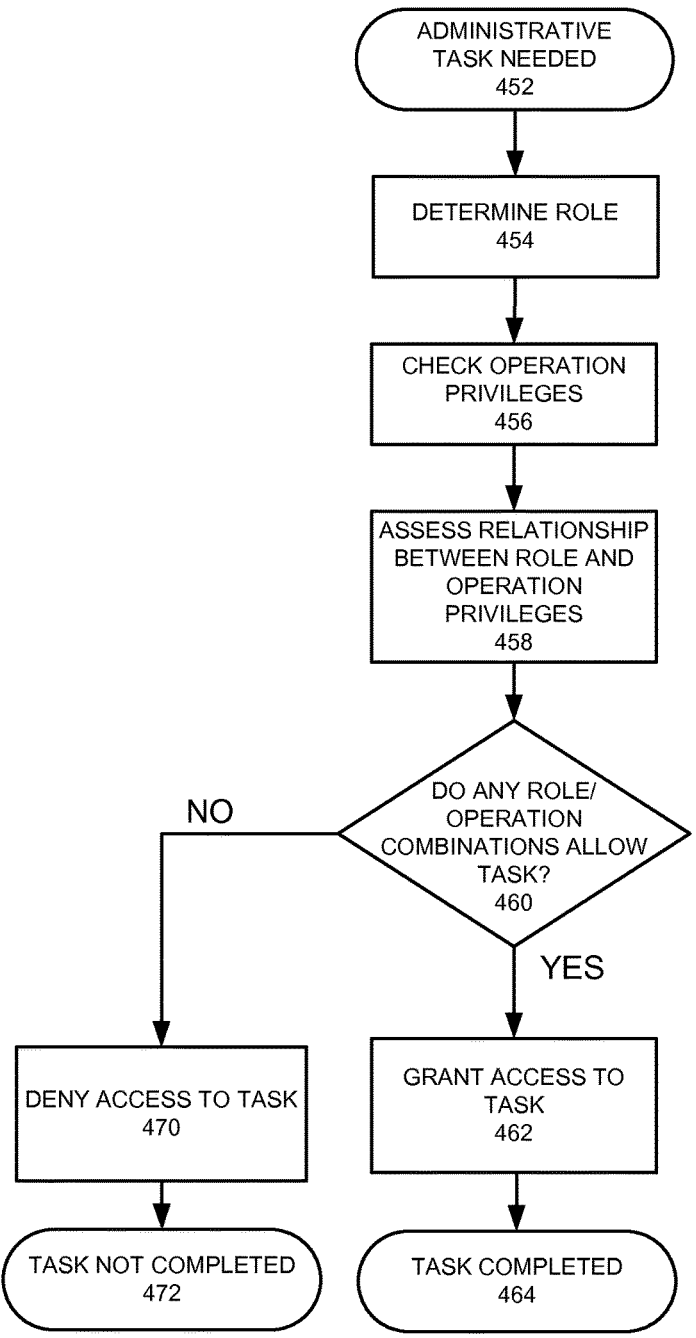
FIG. 4B illustrates another example flow diagram according to example embodiments of the present application.

FIG. 4B illustrates a flow diagram 440 example of authorizing a user access operation using a proxy user permission approach. Referring to FIG. 4B, the user may initiate an access operation via an administrative task access operation to determine if any tasks are needed 452. The application may first determine a particular role of the user 454 and then determine whether the operation privileges are existent 456. The role and the operation may then be assessed for any possible relationship 458. A determination may then be made to determine if the role/operation combinations will permit the task to happen 460. If the task will not be allowed, then the user may be denied access to the task 470 and the task will not be completed 472. If the task will be allowed then the user may be granted access 462 to complete the task 464.

Figure 5A:
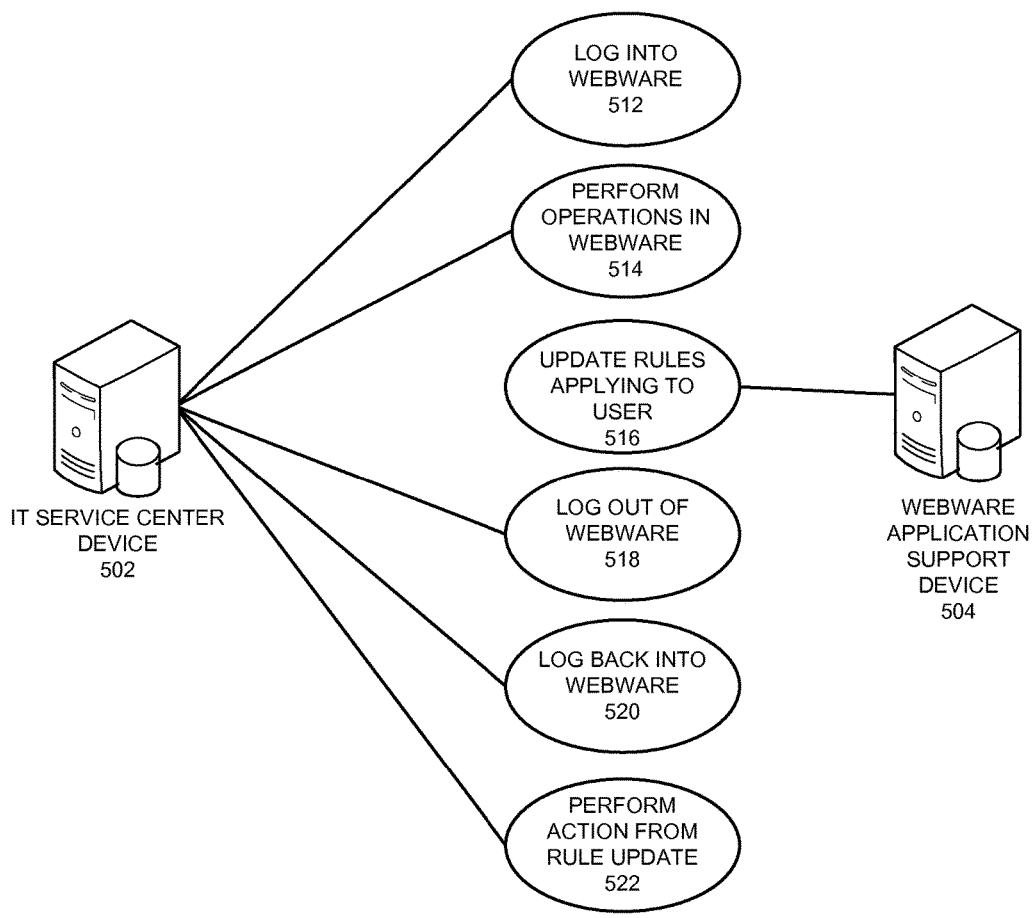
FIG. 5A illustrates an example session establishment and administrative application logic diagram according to conventional prior art authorization applications.
Figure 5B:
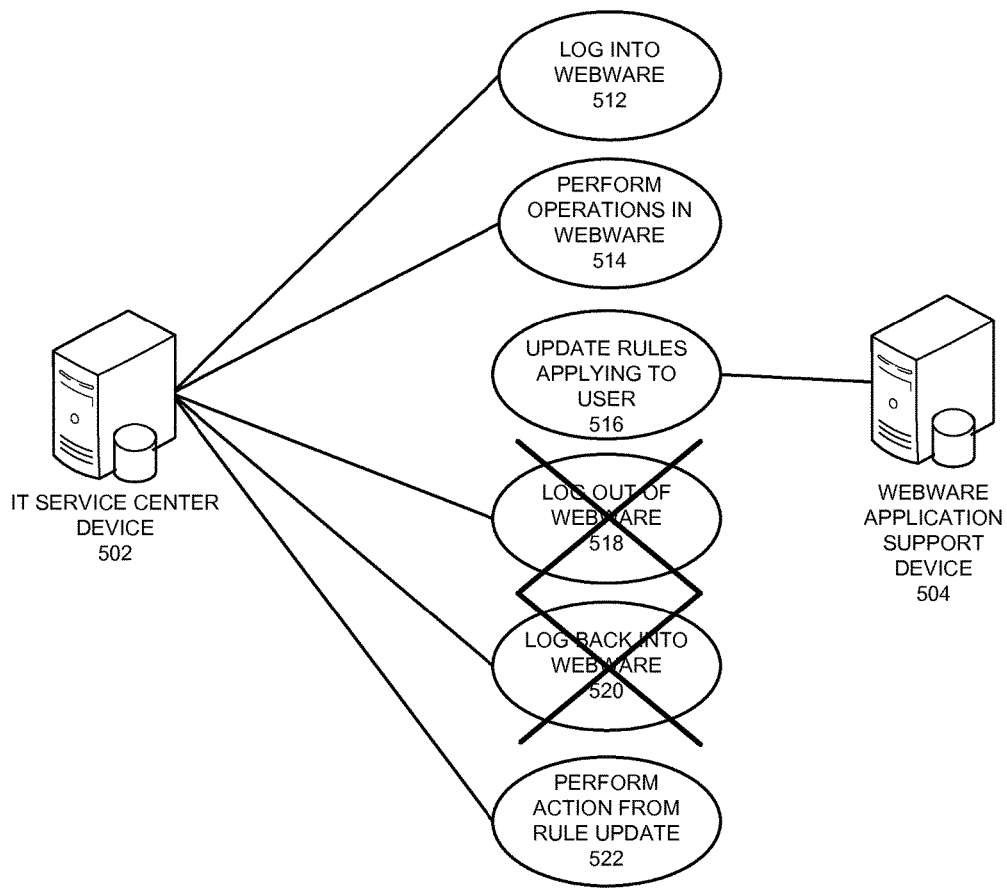
FIG. 5B illustrates an optimized session establishment and administrative application logic diagram according to example embodiments.

FIG. 5A illustrates a conventional prior art approach of accessing a security application. Referring to FIG. 5A, the illustration 500 includes an IT service center device 502 performing six operations including logging into the application 512, performing certain operations 514, updating rules that apply to that user 515 and then logging out of the application 518 and logging back into the application 520 in order to perform an action from the rule updated platform 522. In FIG. 5B, the flow diagram 550 has the operations 518 and 520 eliminated to provide a seamless update scheme and corresponding user authorization function according to example embodiments.

Figure 6:
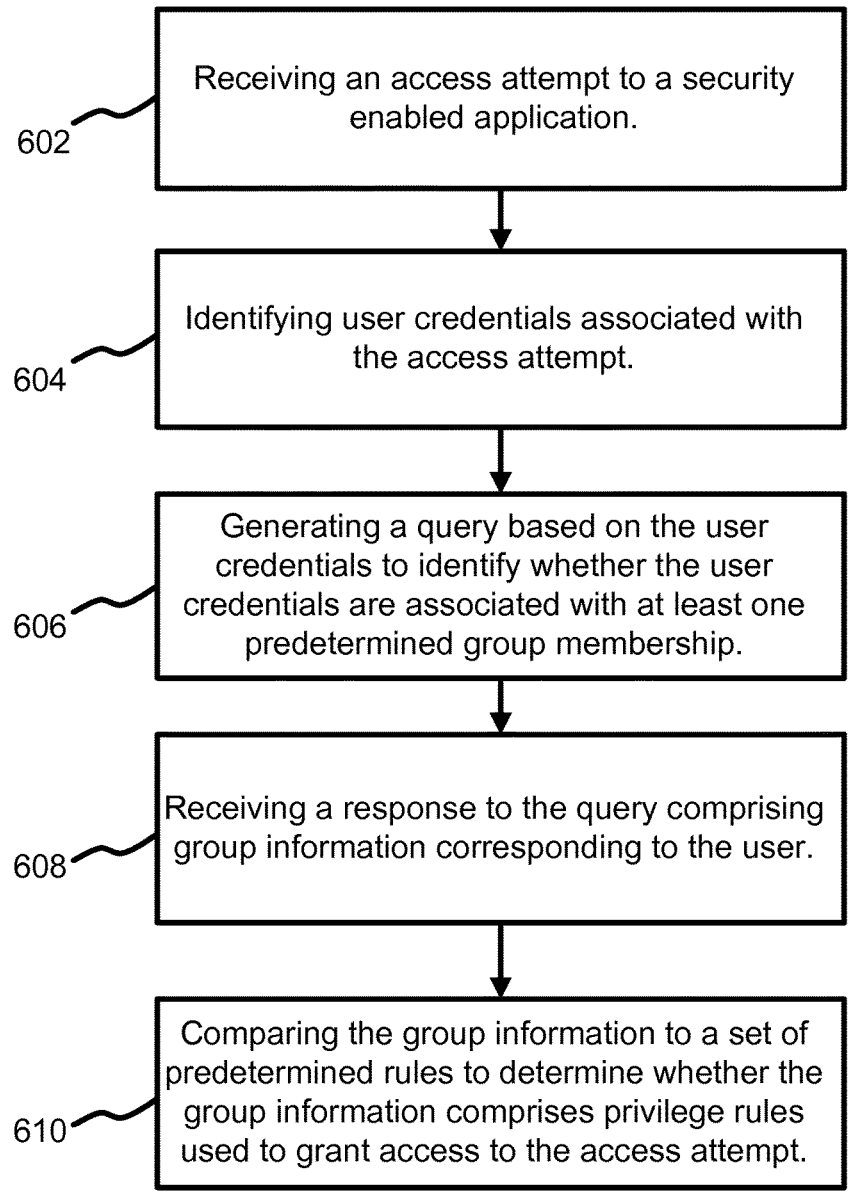
FIG. 6 illustrates a flow diagram of an example method of operation according to an example embodiment of the present application.

FIG. 6 illustrates an example flow diagram of a method of operation according to example embodiments. Referring to FIG. 6, the example flow method 600 includes receiving an access attempt to a security enabled application at operation 602 and identifying user credentials associated with the access attempt at operation 604 via the user device or other user identifying operations. The method may also provide generating a query based on the user credentials to identify whether the user credentials are associated with at least one predetermined group membership at operation 606 and receiving a response to the query comprising group information corresponding to the user at operation 608. The method also includes comparing the group information to a set of predetermined rules to determine whether the group information includes privilege rules used to grant access to the access attempt.

Figure 7:
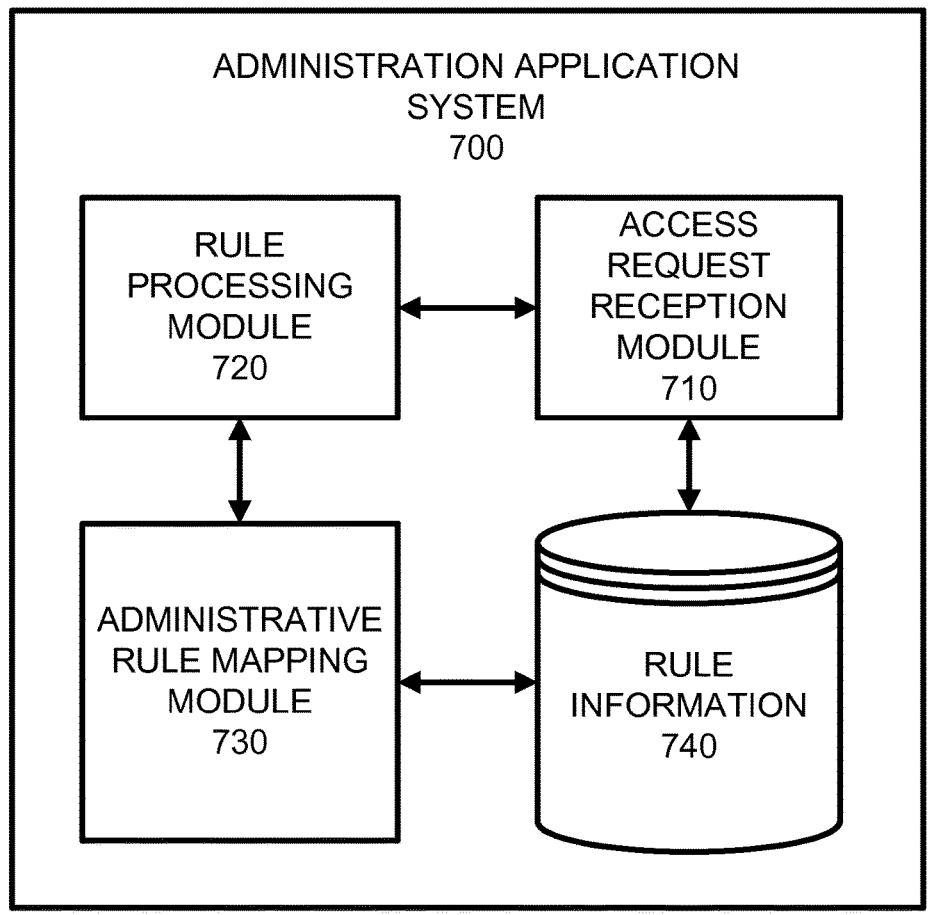
FIG. 7 illustrates a system configuration that is configured to perform one or more operations corresponding to the example embodiments.

FIG. 7 illustrates an example system device(s) configured to perform operations and processes corresponding to the example embodiments. They system may be a stand-alone device, a software embedded application, or a combination of devices working in unison to perform certain operations according to example embodiments of the present application. For example, one example may provide the administrative application system 700 receiving an access request at the reception module 710. The module may identify the message as a request and transmit the request to the rule processing module 720 to identify whether it is an access attempt to a security enabled application and also identify user credentials associated with the access attempt, which may be stored in the rule information database 740. As a result, the rule processing engine 720 may generate a query based on the user credentials to identify whether the user credentials are associated with at least one predetermined group membership. The user account or user information may be part of multiple groups and each may have varying different levels of administrative rights or privileges. The rule mapping module 730 may receive a response to the query which includes group information corresponding to the user, and may then compare the group information to a set of predetermined rules to determine whether the group information includes privilege rules used to grant access to the access attempt.

The set of predetermined rules are stored in an extensible mark-up language (XML) data file and can be retrieved automatically when a request is received. Also, the mapping module 730 may also identify at least one rule in the XML data file that grants access to the access attempt, and as a result, allow the access attempt and at least one task associated with the access attempt. Next, the query may be transmitted to an active directory stored in memory and the active directory can then be queried via the lightweight directory access protocol (LDAP). Also, if a user account associated with the access attempt is identified to be part of at least one group of user accounts then the user account is granted access to administrative privileges which are granted to at least one other user in the at least one group.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example network element 800, which may represent any of the above-described network components, etc.

Figure 8:
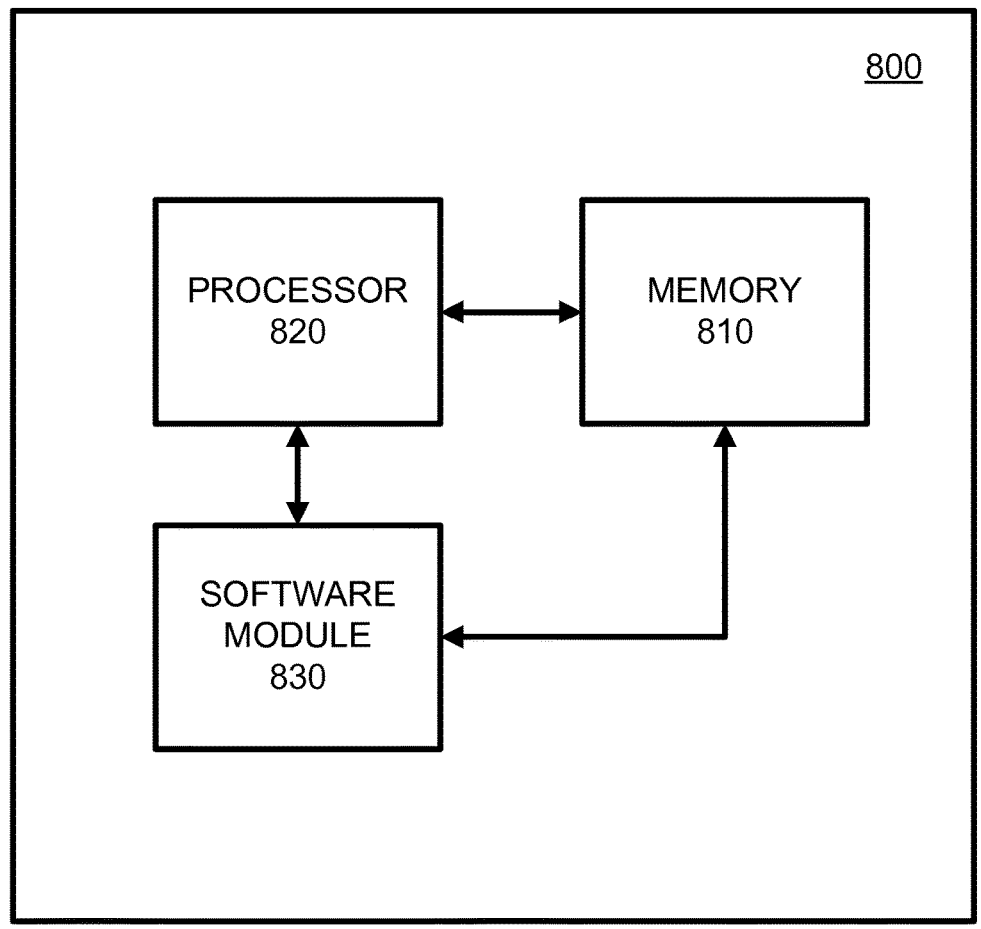
FIG. 8 illustrates an example network entity device configured to store instructions, software, and corresponding hardware for executing the same, according to example embodiments of the present application.

As illustrated in FIG. 8, a memory 810 and a processor 820 may be discrete components of the network entity 800 that are used to execute an application or set of operations. The application may be coded in software in a computer language understood by the processor 820, and stored in a computer readable medium, such as, the memory 810. The computer readable medium may be a non-transitory computer readable medium that includes tangible hardware components in addition to software stored in memory. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 7 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:
1. A method comprising:
  receiving an access attempt to a security enabled application executing on at least one processor;
  identifying, by the security enabled application, user credentials associated with the access attempt;
  generating, by the security enabled application, a query based on the user credentials to identify whether the user credentials are associated with at least one predetermined group membership;
  receiving, by the security enabled application, a response to the query comprising group information corresponding to the user; and
  comparing, by the security enabled application, the group information to a set of predetermined rules to determine whether the group information comprises privilege rules used to grant access to the access attempt;
  wherein the set of predetermined rules are stored in an extensible mark-up language (XML) data file that specifies one or more privilege rules for a plurality of groups, wherein rules exist for operations but not for roles and wherein roles are determined purely by group membership;
  wherein a decision to grant access to the access attempt is dependent on a role of the user and on the group information such that a first user having the first role and first group information is granted access under different conditions to a second user having the first role and second group information different to the first group information;
  wherein at least one rule makes changes to at least one current role of the user to provide limited access on-the-fly to provide the user with access for the access attempt;

wherein at least one rule in the XML data file that grants access to the access attempt is identified;

wherein the access attempt and at least one task associated with the access attempt is allowed;

wherein when a user account associated with the access attempt is part of at least one group of user accounts, the user account is granted access to administrative privileges which are granted to at least one other user in the at least one group.

2. The method of claim 1, wherein the access attempt comprises user credentials.

3. The method of claim 1, further comprising: transmitting the query to an active directory stored in memory.

4. The method of claim 3, wherein the query to the active directory is performed via the lightweight directory access protocol (LDAP).

5. An apparatus comprising:
a receiver configured to receive an access attempt to a security enabled application; and
a processor configured to
identify user credentials associated with the access attempt,
generate a query based on the user credentials to identify whether the user credentials are associated with at least one predetermined group membership,
receive a response to the query comprising group information corresponding to the user,
compare the group information to a set of predetermined rules stored in an extensible mark-up language (XML) data file that specifies one or more privilege rules for a plurality of groups to determine whether the group information comprises privilege rules used to grant access to the access attempt, wherein rules exist for operations but not for roles and wherein roles are determined purely by group membership; and
determine whether to grant access for the access attempt, wherein a decision to grant access to the access attempt is dependent on a role of the user and on the group information such that a first user having the first role and first group information is granted access under different conditions to a second user having the first role and second group information different to the first group information, wherein at least one rule makes changes to at least one current role of the user to provide limited access on-the-fly to provide the user with access for the access attempt;
wherein at least one rule in the XML data file that grants access to the access attempt is identified;
wherein the access attempt and at least one task associated with the access attempt is allowed;
wherein when a user account associated with the access attempt is part of at least one group of user accounts, the user account is granted access to administrative privileges which are granted to at least one other user in the at least one group.

6. The apparatus of claim 5, wherein the access attempt comprises user credentials.

7. The apparatus of claim 5, further comprising: a transmitter configured to transmit the query to an active directory stored in memory.

8. The apparatus of claim 7, wherein the query to the active directory is performed via the lightweight directory access protocol (LDAP).

9. A non-transitory computer readable storage medium configured to store instructions that when executed cause a processor to perform:
receiving an access attempt to a security enabled application;
identifying user credentials associated with the access attempt;
generating a query based on the user credentials to identify whether the user credentials are associated with at least one predetermined group membership;
receiving a response to the query comprising group information corresponding to the user;
comparing the group information to a set of predetermined rules stored in an extensible mark-up language (XML) data file that specifies one or more privilege rules for a plurality of groups to determine whether the group information comprises privilege rules used to grant access to the access attempt, wherein rules exist for operations but not for roles and wherein roles are determined purely by group membership; and
determining whether to grant access for the access attempt, wherein determining whether to grant access for the access attempt is dependent on a role of a user and on the group information such that a first user having the first role and first group information is granted access under different conditions to a second user having the first role and second group information different to the first group information, wherein at least one rule makes changes to at least one current role of the user to provide limited access on-the-fly to provide the user with access for the access attempt;
wherein at least one rule in the XML data file that grants access to the access attempt is identified;
wherein the access attempt and at least one task associated with the access attempt is allowed;
wherein when a user account associated with the access attempt is part of at least one group of user accounts, the user account is granted access to administrative privileges which are granted to at least one other user in the at least one group.

10. The non-transitory computer readable storage medium of claim 9, wherein the access attempt comprises user credentials.

11. The non-transitory computer readable storage medium of claim 9, wherein the processor is further configured to perform: transmitting the query to an active directory stored in memory, wherein the query to the active directory is performed via the lightweight directory access protocol (LDAP).

* * * * *